(12) United States Patent
Settouti et al.

(10) Patent No.: US 10,816,123 B2
(45) Date of Patent: Oct. 27, 2020

(54) STATION FOR HEATING FLUIDS FLOWING THROUGH A NETWORK OF SUBMARINE PIPELINES

(71) Applicant: SAIPEM S.A., Montigny le Bretonneux (FR)

(72) Inventors: Narimane Settouti, Paris (FR); Jacques Ruer, Fourqueux (FR); Philippe Muguerra, Saint Cyr l'Ecole (FR); Damien Spudic, Rueil-Malmaison (FR)

(73) Assignee: Saipem S.A., Montigny le Bretonneux (FR)

( * ) Notice: Subject to any disclaimer, the term of this patent is extended or adjusted under 35 U.S.C. 154(b) by 659 days.

(21) Appl. No.: 15/523,235

(22) PCT Filed: Oct. 29, 2015

(86) PCT No.: PCT/FR2015/052919
§ 371 (c)(1),
(2) Date: Apr. 28, 2017

(87) PCT Pub. No.: WO2016/066968
PCT Pub. Date: May 6, 2016

(65) Prior Publication Data
US 2017/0336011 A1   Nov. 23, 2017

(30) Foreign Application Priority Data
Oct. 31, 2014 (FR) ...................................... 14 60511

(51) Int. Cl.
*H05B 6/10* (2006.01)
*F16L 53/34* (2018.01)
(Continued)

(52) U.S. Cl.
CPC .............. *F16L 53/34* (2018.01); *H05B 6/108* (2013.01); *H05B 6/365* (2013.01); *H05B 6/44* (2013.01); *H05B 2214/03* (2013.01)

(58) Field of Classification Search
CPC .......... H05B 6/108; H05B 6/365; H05B 6/44; H05B 2214/03; F16L 53/34
(Continued)

(56) References Cited

U.S. PATENT DOCUMENTS 4,874,916 A * 10/1989 Burke ..................... H05B 6/02
                                                          219/671
5,425,048 A *  6/1995 Heine .................. B22D 41/015
                                                          373/151

(Continued)

FOREIGN PATENT DOCUMENTS

DE       10 28 710       4/1958
DE       1028710 B  *   4/1958  ............. H05B 6/108
(Continued)

*Primary Examiner* — Hung D Nguyen
(74) *Attorney, Agent, or Firm* — Cozen O'Connor

(57) ABSTRACT

The invention provides a heater station (2) for heating fluids flowing in an undersea pipe network, the station comprising at least one heater duct (6) made of conductive material designed to be connected to an undersea pipe (4) for transporting fluids, and at least one solenoid (8) wound around a portion of the heater duct and electrically powered to heat the heater duct portion by electromagnetic induction.

10 Claims, 4 Drawing Sheets

(51) Int. Cl.
*H05B 6/44* (2006.01)
*H05B 6/36* (2006.01)

(58) Field of Classification Search
USPC ............... 219/628, 629, 630, 671, 672, 674
See application file for complete search history.

(56) References Cited

U.S. PATENT DOCUMENTS

| | | | |
|---|---|---|---|
| 2012/0061382 A1* | 3/2012 | Yang | H05B 6/108 |
| | | | 219/628 |
| 2013/0098625 A1* | 4/2013 | Hickman | F16L 53/34 |
| | | | 166/335 |
| 2013/0233429 A1 | 9/2013 | Blue | |

FOREIGN PATENT DOCUMENTS

| | | |
|---|---|---|
| PL | 86 733 | 6/1976 |
| WO | WO 2007/055592 | 5/2007 |
| WO | WO 2012/064641 | 5/2012 |

\* cited by examiner

STATION FOR HEATING FLUIDS FLOWING THROUGH A NETWORK OF SUBMARINE PIPELINES

PRIORITY CLAIM

This is a U.S. national stage of application No. PCT/FR2015/052919, filed on Oct. 29, 2015. Priority is claimed on France Application No. FR1460511, filed Oct. 31, 2014, the content of which is incorporated here by reference.

BACKGROUND OF THE INVENTION

The present invention relates to the general field of undersea pipes resting on the sea bottom and providing a connection between undersea wells for producing hydrocarbons, in particular oil and gas, and a surface installation, e.g. a floating, production, storage, and off-loading unit.

In a given off-shore hydrocarbon production field, it is common practice to work a plurality of wells that may be spaced apart from one another by several kilometers or even tens of kilometers. The fluids coming from these various wells need to be collected by undersea pipes resting on the sea bottom and transferred via bottom-to-surface connection pipes to a surface installation, e.g. a ship or a shore collection point for collecting and storing them (and possibly processing them).

Furthermore, because the fluids (oil and gas) from the undersea hydrocarbon production wells are extracted at great depth in the subsoil, they leave the wells at a temperature that is relatively high at the level of the sea bottom (typically of the order of 70° C.). Since sea water is generally cold, particularly at great depths where it is typically at 4° C., if no arrangements are made for conserving the temperature of the fluids leaving production wells, they will cool progressively while traveling along the kilometers of undersea pipes. Unfortunately, those fluids contain various chemical compounds for which cooling leads to phenomena appearing that are impediments to maintaining good flow conditions.

Thus, molecules of gas, in particular of methane, combine with molecules of water to form hydrate crystals at low temperature. These crystals can stick to the walls, where they collect together and lead to the formation of plugs capable of blocking the undersea pipe. Likewise, the solubility in oil of high molecular weight compounds, such as paraffins or asphaltenes, decreases with lowering temperature, thereby giving rise to solid deposits that are likewise capable of blocking the undersea pipe.

One of the known solutions for attempting to remedy those problems consists in thermally insulating undersea pipes in order to conserve as much as possible the initial heat of the fluids being transported. Several technologies are available for this purpose, including for example making use of coaxial pipes comprising an inner pipe conveying the fluids and an outer pipe coaxial with the inner pipe and in contact with the undersea medium, the annular space between the inner and outer pipes being filled with a thermally insulating material or else being evacuated.

Nevertheless, that solution of thermally insulating undersea pipes can at best only slow down the inevitable cooling of the fluids being transported. In particular, if the distance to be traveled at the bottom of the water is too great, or if the flow rate of the fluid is slowed or even stopped for a certain length of time, then the temperature of the fluids can drop below a critical threshold.

Another known solution for avoiding the formation of plugs in undersea pipes consists in cleaning them frequently by causing scrapers (also known as "pigs") to travel inside them and remove any deposits from the walls.

Nevertheless, in order to avoid any risk of a scraper jamming in the pipe, scraping an undersea pipe can at best eliminate only deposits that are of relatively modest sizes. Furthermore, in spite of having recourse to scraping, that solution still requires the pipes to be thermally insulated in order to limit as much as possible the formation of solid deposits inside them.

Another known solution consists in heating undersea pipes over their entire length by one or more electric cables that are wound around the pipes to heat them by the Joule effect. That solution is referred to as trace heating and serves to keep the fluids transported in undersea pipes at a temperature higher than a critical threshold over their entire path from the production well to the surface installation.

That solution presents manifest problems associated with installing such electric heater cables over the entire length of the undersea pipes, with the high costs that are involved in terms of installation and maintenance. Furthermore, trace heating is based on continuity of the installation all along the undersea pipes. Unfortunately, if such continuity should be interrupted for any reason at a particular location in the pipes, then the entire installation is put out of service. This constraint thus makes it necessary to consider that type of heating only during so-called "preservation" stages for preserving the transported fluids, and not for operational stages.

OBJECT AND SUMMARY OF THE INVENTION

A main object of the present invention is thus to propose a heater station that does not present the above-mentioned drawbacks.

This object is achieved by a heater station for heating fluids flowing in an undersea pipe network, the station comprising at least one heater duct made of conductive material designed to be connected to an undersea pipe for transporting fluids, and at least one solenoid wound around a portion of the heater duct and electrically powered to heat the heater duct portion by electromagnetic induction.

The heater station of the invention is remarkable in its great flexibility of use: by suitably arranging one or more heater stations along undersea pipes, it is possible to ensure that the transported fluids are at a temperature level that is sufficient over a very great length of undersea pipes. By way of example, in an undersea pipe network having a length of 240 kilometers (km), and when managing heating under conditions that require continuous heating of the pipes during a normal operation stage, the heater stations may be connected at intervals of about once every 30 km along the pipes.

Furthermore, the heater stations are entirely removable and can thus easily be disconnected from the undersea pipes in order to be taken to some other location in the network or in order to be subjected to a maintenance or repair operation. They can also be incorporated in existing pipe networks since connecting them to an undersea pipe does not require major modification of the network. In the event of a heater station failing, the remainder of the operating line is unaffected (the other heater stations are not put out of operation).

The heater stations of the invention thus present great ease of installation on a pipe network (they are removable and independent of one another), very great flexibility in use (they can be used during a normal production stage, during a fluid preservation stage, etc.), and low installation and maintenance costs.

Advantageously, the heater duct has a plurality of duct turns each provided with a duct section around which a solenoid is wound. It is thus possible to heat a long length of duct while occupying a small area on the ground. Under such circumstances, the duct turns may form a coil.

The heater duct may have a number of duct turns that is a multiple of the number of phases of the electrical power supply, each duct turn comprising a duct section having a solenoid wound thereabout, the solenoids being electrically connected so as to obtain a polyphase circuit. Thus, the heater duct may have six duct turns, and the solenoids may be connected in series in pairs so as to form three pairs of solenoids powered with three-phase electricity.

Preferably, the heater station further includes insulation interposed between the heater duct and the solenoids. The presence of insulation makes it possible to provide the heater duct with thermal insulation so as to avoid any loss of heat to the outside.

Also preferably, the heater station further comprises magnetic yokes arranged at opposite ends of the solenoid to contain the magnetic field created thereby. The presence of magnetic yokes makes it possible to concentrate the flux of the electromagnetic fields onto the heater duct.

The solenoid may be wound around a portion of the heater duct in at least two superposed layers. The solenoid may also be embedded in resin.

Advantageously, the heater duct and the solenoid are housed in a sealed enclosure that is removable and suitable for being connected to an undersea pipe for transporting fluids.

Under such circumstances, a wall of the enclosure may include a layer of thermally insulating material and the enclosure may be for connection to an undersea pipe for transporting fluids either directly or by means of a connection pipe.

BRIEF DESCRIPTION OF THE DRAWINGS

Other characteristics and advantages of the present invention appear from the following description made with reference to the accompanying drawings which show embodiments having no limiting character. In the figures.

DETAILED DESCRIPTION OF THE INVENTION

The invention applies to any undersea pipe network providing a connection between at least one undersea hydrocarbon production well and a surface installation.

Such an undersea pipe network serves to transport the hydrocarbons (oil and gas) coming from one or more undersea production wells to take them to a surface installation, e.g. a floating production storage and off-loading (FPSO) unit.

Such networks generally comprise a plurality of undersea pipes placed on the sea bottom and conveying fluids coming from production wells.

Figure 1:
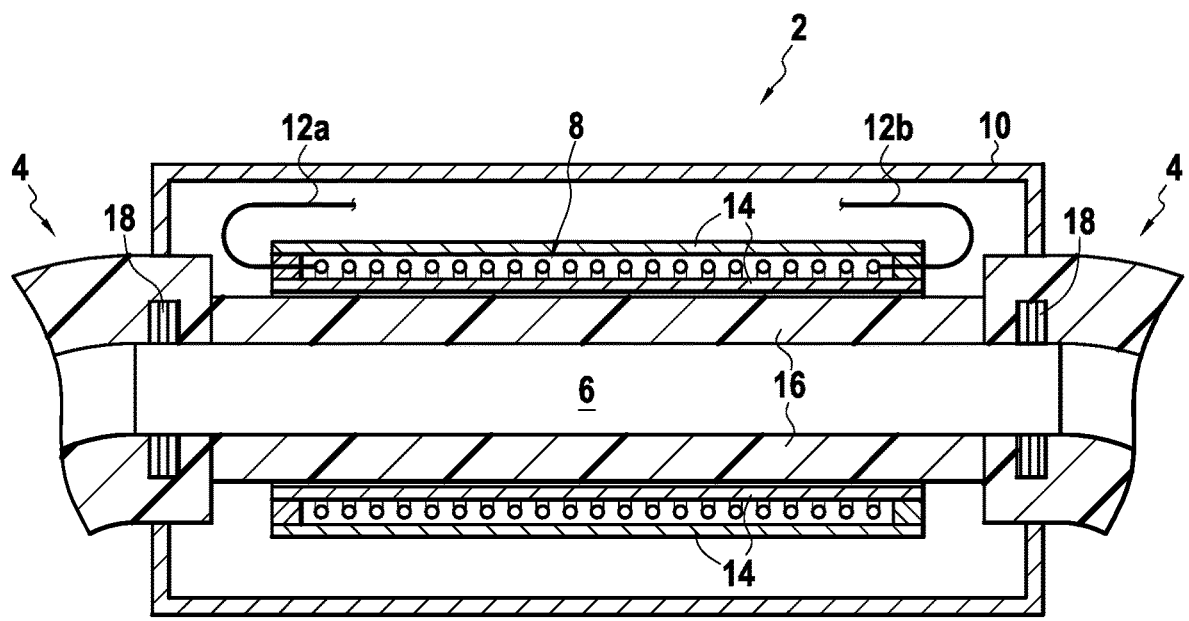
FIG. 1 is a diagrammatic view of a heater station in a first embodiment of the invention.

In order to keep the fluids being transported in these undersea pipes at a temperature that is higher than a critical threshold so as to avoid deposits being formed inside said pipes, the invention makes provision for connecting the pipes to one or more removable heater stations, such as the station shown in FIG. 1.

The heater station 2 shown in FIG. 1 is connected removably on an undersea pipe 4. It is controlled from the surface installation (not shown in the figure) as a function in particular of the mode of operation of the network (typically: a stage of normal operation; a preservation stage; or a stage of restarting production).

The heater station 2 of the invention operates on the principle of electromagnetic induction. For this purpose, it has at least one heater duct 6 made of conductive material (e.g. out of metal, stainless steel, carbon, etc.) and suitable for being connected to an undersea pipe 4 in which there flow fluids from production wells, and at least one solenoid 8 that is wound around a portion of the heater duct and that is electrically powered from the surface installation in order to heat the heater duct portion by electromagnetic induction.

More precisely, the heater duct 6 and the solenoid 8 may be housed inside a sealed enclosure 10 that rests on the sea bottom and that can easily be moved to some other location of the network, e.g. in order to be subjected to a maintenance or repair operation (typically by means of a robot that is guided from the surface installation). Advantageously, the enclosure 10 of the heater station of the invention occupies little area on the ground. Alternatively, the heater duct may be placed directly in the water, with only the solenoid being sealed.

In the embodiment of FIG. 1, the solenoid 8 is constituted by a winding of a single layer of turns of copper wire that is connected at one end to an inlet electric cable 12a and at its opposite end to an outlet electric cable 12b, the cables 12a and 12b being electrically powered from the surface installation.

By way of example, in order to make the solenoid 8, it is possible to use a winding having 80 turns per meter made with a copper wire having a diameter of 8 millimeters (mm) that is incorporated between two tubes 14 made of fiber-glass-reinforced plastics material. The inside volume defined by the tubes 14 may be filled with a resin.

Still as an example, it is possible to apply to the terminals of the solenoid 8 as assembled in this way a voltage of about 2640 volts (V) with current of 150 amps (A).

The heater station 2 preferably also includes insulation 16 that is interposed between the heater duct 6 and the solenoid 8. By way of example, this insulation 16 may be based on polypropylene, polyurethane, or polyethylene.

The presence of such insulation 16 serves to provide the heater duct 6 with effective thermal insulation so as to avoid losing any heat to the outside.

Furthermore, as an alternative or in addition to the insulation 16, the wall of the enclosure 10 may include a layer of thermally insulating material.

Also preferably, the heater station 2 further includes two magnetic yokes 18 that are disposed at opposite ends of the solenoid 8 so as to concentrate the electromagnetic field created thereby. For example, as shown in the embodiment in FIG. 1, these yokes 18 may be arranged around the heater duct 6 at each of its ends.

Typically, each yoke 18 is made up of a stack of magnetic laminations having a thickness of about 100 mm. By containing the electromagnetic field, these yokes serve to reduce the need for induction current for any given value of heating. Furthermore, the presence of these yokes serves to avoid any electromagnetic radiation leaking out from the heater duct 6, thereby avoiding any interference with nearby electronic equipment.

Figure 2:
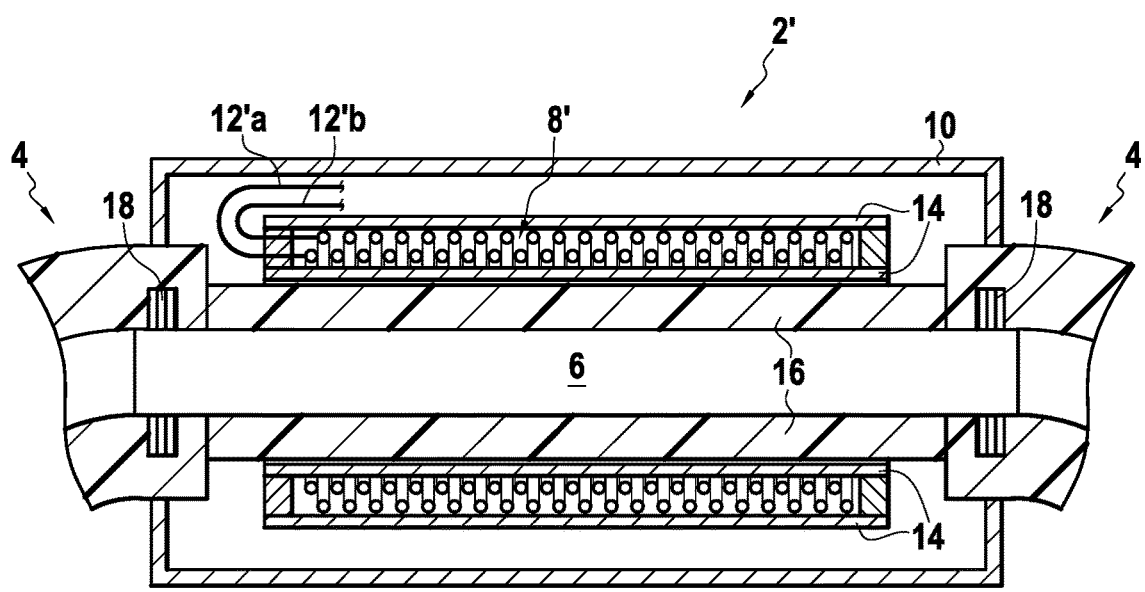
FIG. 2 is a diagrammatic view of a heater station in a variant of the first embodiment.

FIG. 2 shows a variant embodiment in which the solenoid 8' of the heater station 2' is wound around the heater duct 6 as two superposed layers.

With such an arrangement, it is possible to have the inlet electric cable 12'*a* and the outlet electric cable 12'*b* positioned at the same end of the solenoid 8'. Thus, it is simpler to connect these cables 12'*a* and 12'*b* to the surface installation (in comparison with the arrangement of FIG. 1).

Figure 3:
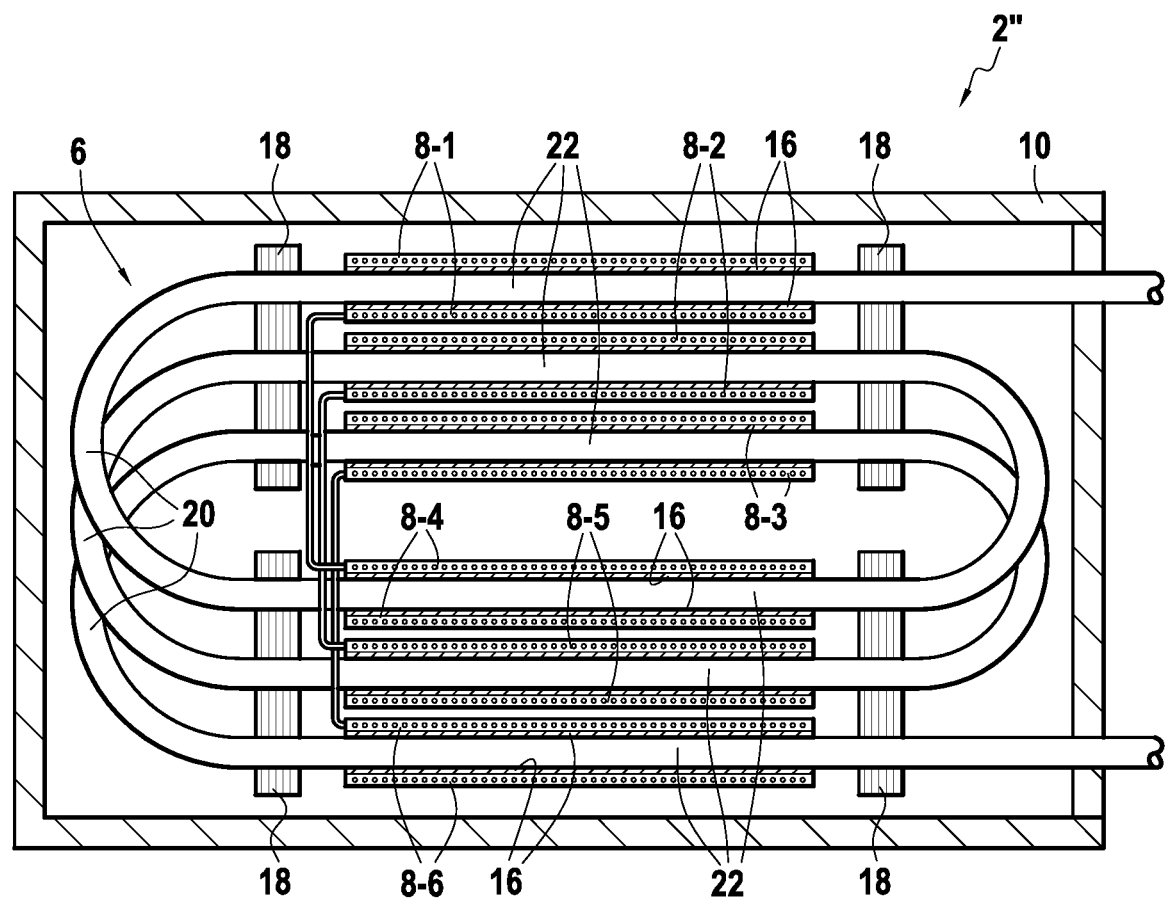
FIG. 3 is a diagrammatic view of a heater station in a second embodiment of the invention.
Figure 4:
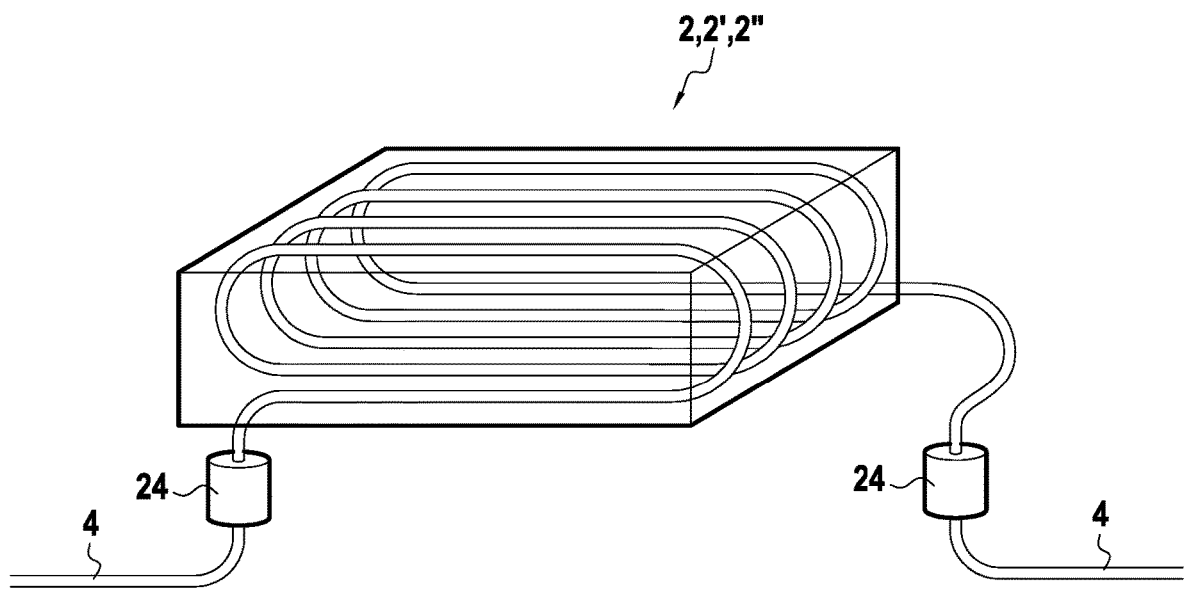
FIGS. 4 to 7 show various characteristics of heater stations of the invention.

FIG. 3 is a diagrammatic view of a heater station 2" in a second embodiment of the invention.

In this embodiment the heater duct 6 of the heater station 2" comprises a plurality of duct turns 20 (e.g. six of them) each having a section 22, e.g. a rectilinear section, around which a respective solenoid 8 is wound.

As can be seen in FIG. 3, these duct turns 20 form a coil that is housed inside a sealed enclosure 10. The term "coil" is used herein to designate a heater duct that is wound as a spiral or a helix so as to achieve a long length of duct in an enclosure 10 of limited dimensions.

By way of example, it is possible to use a coil comprising six rectilinear duct sections 22 each having a length of 20 meters (m), thus enabling 120 m of heater duct portions to be contained within an enclosure occupying small area on the ground.

Each rectilinear pipe section 22 of the heater station 2" is heated by its own solenoid. More precisely, the heater station 2" in this second embodiment advantageously has six solenoids 8-1 to 8-6 that are connected in series in pairs so as to form three pairs of solenoids. Thus, the solenoid 8-1 is connected in series with the solenoid 8-4, the solenoid 8-2 is connected in series with the solenoid 8-5, and the solenoid 8-3 is connected in series with the solenoid 8-6.

These three pairs of solenoids as constituted in this way are preferably powered from the surface installation with three-phase electricity. For example, each solenoid may carry an electric current of 150 A.

The voltage across the terminals of this circuit depends on the electrical connection configuration (star or delta). Furthermore, in a variant that is not shown, the three pairs of solenoids could be connected in parallel (instead of being connected in series).

With such an arrangement, it is possible to reach a heater power for the heater duct 6 of as much as 1200 kilowatts (kW), thus enabling the outside temperature of the heater duct to rise to 120° C.

Naturally, as for the first embodiment described with reference to FIGS. 1 and 2, the heater station 2" may also have insulation 16 that is arranged between each rectilinear pipe section 22 and each solenoid 8-1 to 8-6. Likewise, magnetic yokes 18 may advantageously be arranged at each end of the solenoids 8-1 to 8-6 in order to contain the electromagnetic fields they create.

Furthermore, the pipe sections around which the solenoids are wound need not necessarily be rectilinear and the solenoids may be arranged in a manner different from that described herein. Likewise, the number of duct turns is not necessarily equal to six (it is preferably equal to a multiple of the number of phases used for the electrical power supply: typically 4, 8, 12, etc. for two-phase AC or 6, 9, 12, etc. for three-phase AC, etc.).

With reference to FIGS. 4 to 7, there follows a description of various characteristics common to the various above-described heater stations.

Figure 5:
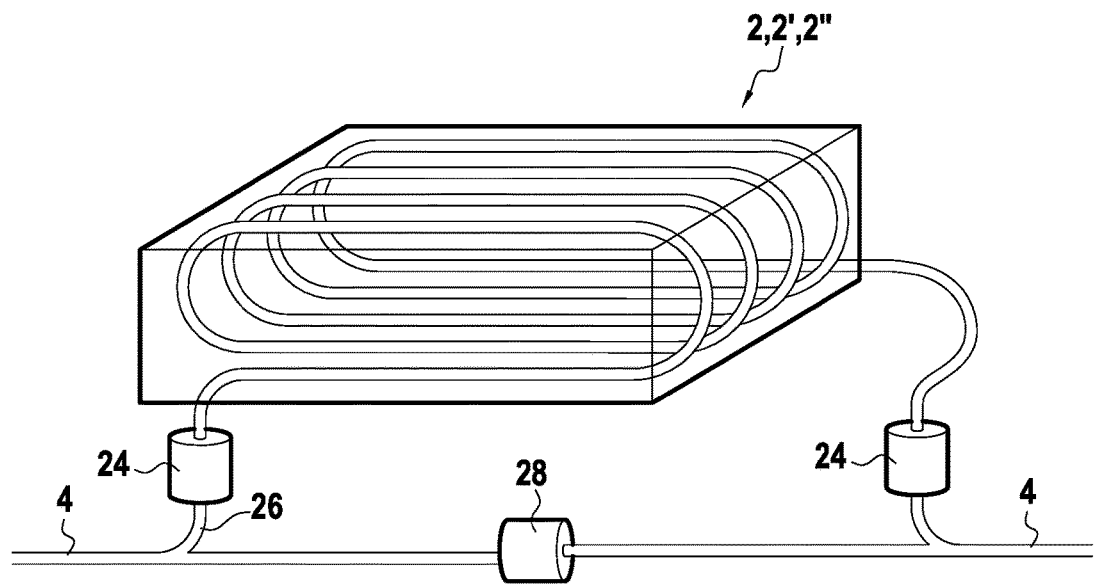

As shown in FIG. 5, the heater station 2, 2', 2" is connected directly to an undersea pipe 4, e.g. by means of valves 24.

Figure 6:
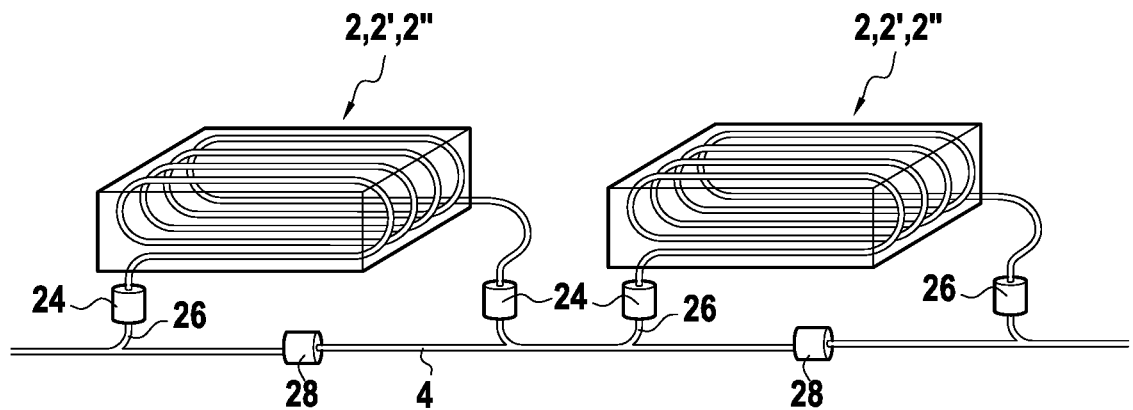

Alternatively, in the embodiment of FIG. 6, the heater station 2, 2', 2" is connected to an undersea pipe 4 by means of a bypass pipe 26 connected to the corresponding undersea pipe by valves 24. In addition, the undersea pipe 4 is equipped with a bypass valve 28.

Figure 7:
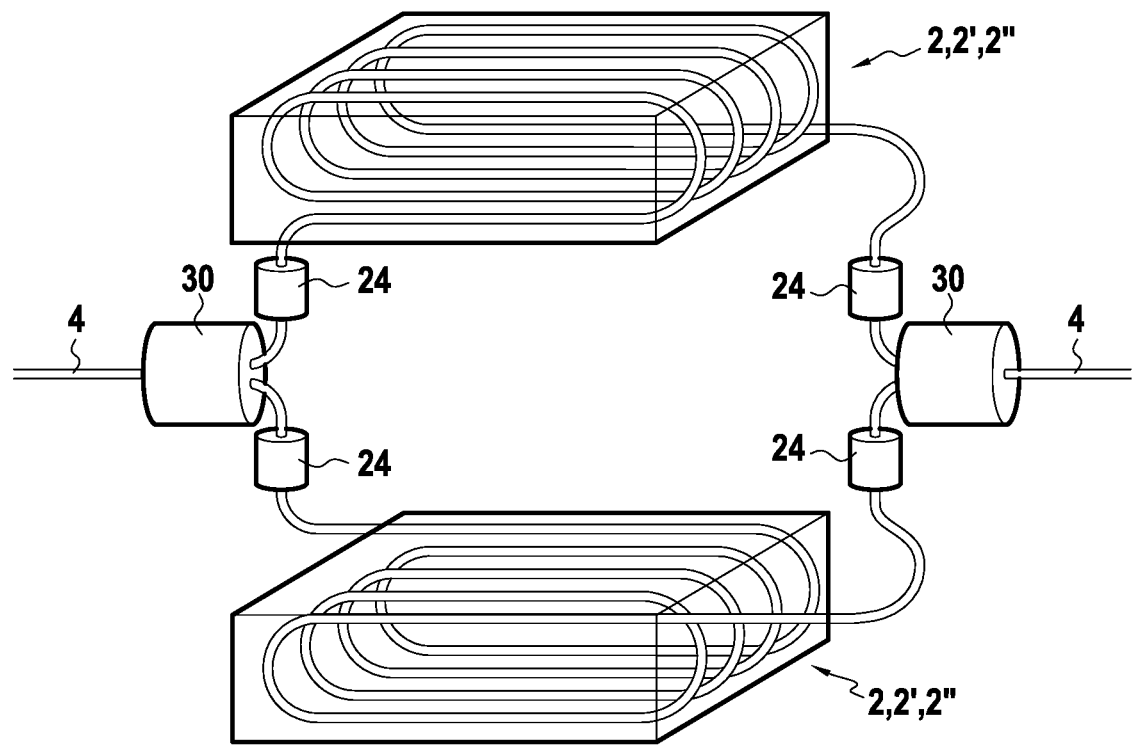

In the embodiment of FIG. 7, the undersea pipe 4 is connected to two heater stations 2, 2', 2" installed in series on the connection principle of FIG. 6 (using bypass pipes 26 and having recourse to bypass valves 28).

This embodiment thus provides heater station redundancy in which each heater station is capable on its own of delivering the desired heating to the transported fluid. Under normal circumstances, only one of the two heater stations is used, or both of them are used at half-power. If one of the heater stations is withdrawn, then the other station takes over.

Finally, in the variant embodiment of FIG. 8, the undersea pipe 4 is connected to two heater stations 2, 2', 2" that are installed in parallel, with devices 30 being present upstream and downstream from the heater stations for the purpose of directing a scraper for the purpose of scraping any deposits from the walls.

The invention claimed is:

1. A heater station for heating fluids flowing in an undersea pipe network, the station comprising: a removable sealed enclosure housing at least one heater duct made of conductive material designed to be removably connected to an undersea pipe for transporting fluids; at least one solenoid wound around a portion of the heater duct and electrically powered to heat the heater duct portion by electromagnetic induction; and magnetic yokes arranged at opposite ends of the solenoid to contain the magnetic field created thereby;

wherein the heater duct has a number of duct turns that is a multiple of the number of phases of the electrical power supply, each duct turn comprising a duct section having a solenoid wound thereabout, the solenoids being electrically connected so as to obtain a polyphase circuit.

2. The heater station according to claim 1, wherein the heater duct has a plurality of duct turns, each provided with a duct section around which a solenoid is wound.

3. The heater station according to claim 2, wherein the duct turns form a coil.

4. The heater station according to claim 1, wherein the heater duct has six duct turns, and the solenoids are connected in series in pairs so as to form three pairs of solenoids powered with three-phase electricity.

5. The heater station according to claim 1, further including insulation interposed between the heater duct and the solenoids.

6. The heater station according to claim 1, wherein the solenoid is wound around a portion of the heater duct in at least two superposed layers.

7. The heater station according to claim 1, wherein the solenoid is embedded in resin.

8. The heater station according to claim 1, wherein the heater duct and the solenoid are housed in a sealed enclosure that is removable and suitable for being connected to an undersea pipe for transporting fluids.

9. The heater station according to claim 8, wherein a wall of the enclosure includes a layer of thermally insulating material.

10. The heater station according to claim 8, wherein the enclosure is for connection to an undersea pipe for transporting fluids either directly or by means of a connection pipe.

\* \* \* \* \*